United States Patent [19]

Getz

[11] Patent Number: 4,964,384
[45] Date of Patent: Oct. 23, 1990

[54] TORNADO ENGINE

[76] Inventor: Carl M. Getz, 1610 Plunkett St., Hollywood, Fla. 33020

[21] Appl. No.: 400,949

[22] Filed: Aug. 31, 1989

[51] Int. Cl.[5] ............................................. F02B 31/00
[52] U.S. Cl. .......................... 123/306; 123/079.00 C; 123/188.00 B
[58] Field of Search ............ 123/79 C, 188 B, 188 M, 123/301, 306, 309, 659, 663

[56] References Cited

U.S. PATENT DOCUMENTS

| | | | |
|---|---|---|---|
| 2,222,731 | 11/1940 | Wallgren | 123/188 B |
| 2,756,732 | 7/1956 | Olson | 123/79 C |
| 2,979,046 | 4/1961 | Buchi | 123/188 B |
| 2,988,072 | 6/1961 | Colton | 123/79 C |
| 4,106,439 | 8/1978 | Kanao | 123/188 B X |
| 4,805,573 | 2/1989 | Macfarlane | 123/52 M X |
| 4,893,592 | 1/1990 | Falero | 123/79 C |

Primary Examiner—Tony M. Argenbright
Attorney, Agent, or Firm—Joseph Zallen

[57] ABSTRACT

The cylinder head of an engine has internal truncated conical intake and exhaust passageways which create a swirling mixture of gases in the cylinder. The intake valve is in the form of a ring with a plurality of parallel valve stems, preferably four, all these stems being simultaneously actuable by the camshaft lobes.

7 Claims, 6 Drawing Sheets

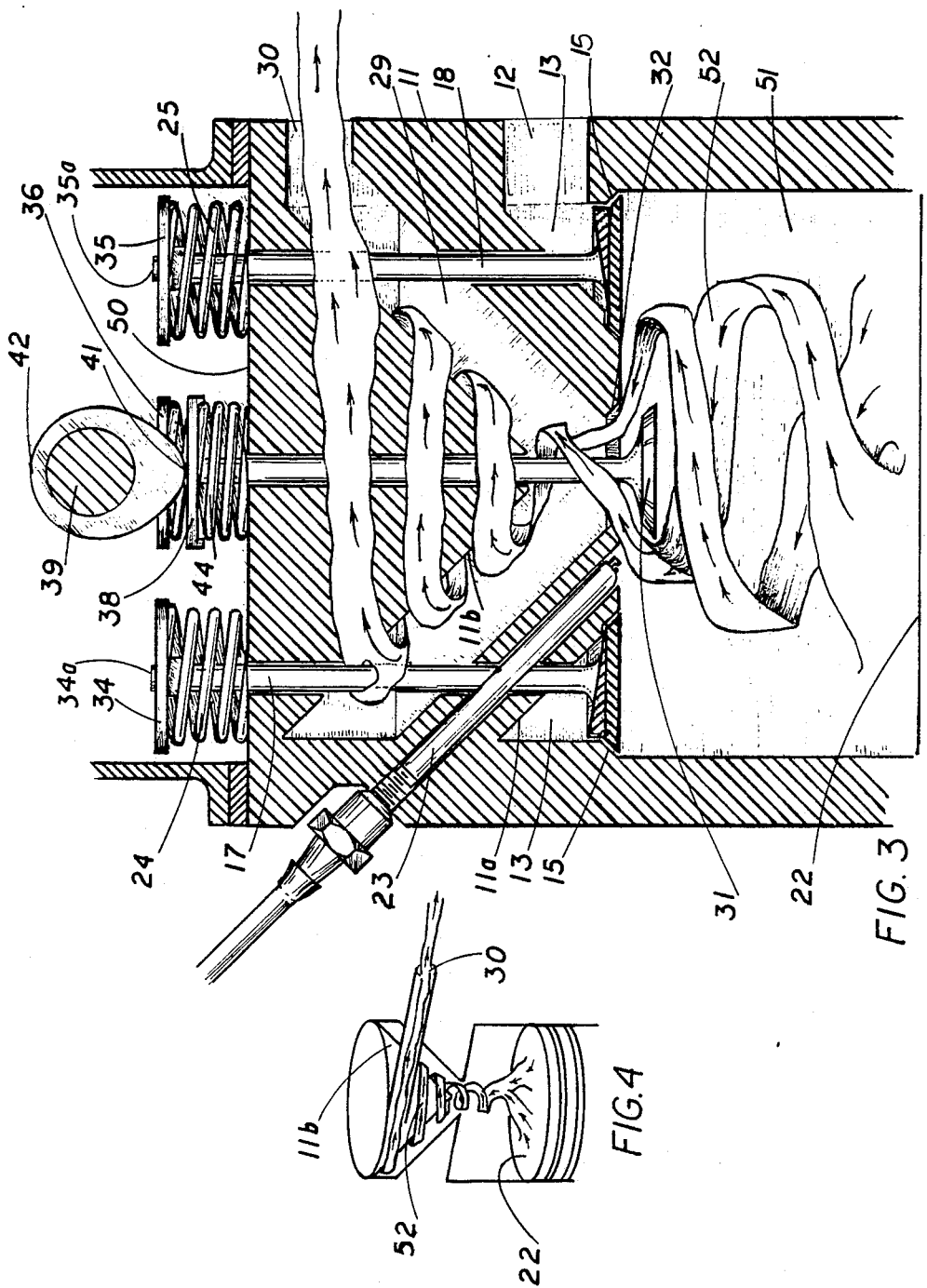

TORNADO ENGINE

BACKGROUND OF INVENTION

The invention relates to a piston-type internal combustion engine where the intake valve encircles the exhaust valve. In particular, it relates to such an engine wherein the cylinder head has internal funnel shaped intake and exhaust passageways which create a swirling mixture of the gases into the cylinder.

PRIOR ART

Swirling-mixture engines which have been previously described have been too complex and expensive and do not have enough efficiency for commercial use, as indicated by the following representative prior art.

U.S. Pat. No. 2,988,071 of Neir describes a concentric valve internal combustion engine. It uses sliding tubes and is a functionally integral valve incorporating both the intake and exhaust. When the intake valve opens, the exhaust valve must seat on and move with it.

U.S. Pat. No. 3,015,323 of Buchi describes a concentric valve engine which uses a bell-shaped intake valve integrated with a tulip-shaped exhaust. Here, again, when the intake valve opens, the exhaust valve must seat on and move with it.

U.S. Pat. No. 3,055,350 of Buchi relates to levers for actuating the intake and exhaust valves in a concentric valve engine.

U S. Pat. No. 3,335,707 of Heinrich discloses a helical inlet duct which produces a rotary swirl to an eccentrically situated inlet valve.

U.S. Pat. No. 4,398,511 of Nemazi is concerned with a movable vane for varying the diameter of the inlet port.

U.S. Pat. No. 4,424,777 of Klomp also discloses adjustable inlet valve vanes.

U.S. Pat. No. 4,428,335 of Cataldo uses an annular nozzle to create a helical flow in the intake passageway.

OBJECTS OF INVENTION

One object of the present invention is to provide a more efficient and inexpensive engine which provides a swirling flow of the combustion gases into the cylinder of the engine. Other objects and advantages of this invention will be apparent from the description and claims which follow, taken together with the appended drawings.

SUMMARY OF INVENTION

A principal feature of this invention is the combination with an engine cylinder of a truncated conical intake passageway and a separate intake valve, surrounding a separate exhaust valve and a truncated conical exhaust passageway. The exhaust passageway is positioned above the intake passageway. The valves are operated by the lobes of one or more camshafts.

Another feature of this invention is that the intake valve is in the form of a ring with a plurality of parallel valve stems, preferably four, all these stems being simultaneously actuable by the camshaft lobes.

BRIEF DESCRIPTION OF DRAWINGS

FIG. 3 is a transverse section through one cylinder of the engine in the exhaust mode.

FIG. 4 is a diagrammatic perspective view of the exhaust flow.

SPECIFIC EXAMPLE OF THE INVENTION

Figures 1, 2:
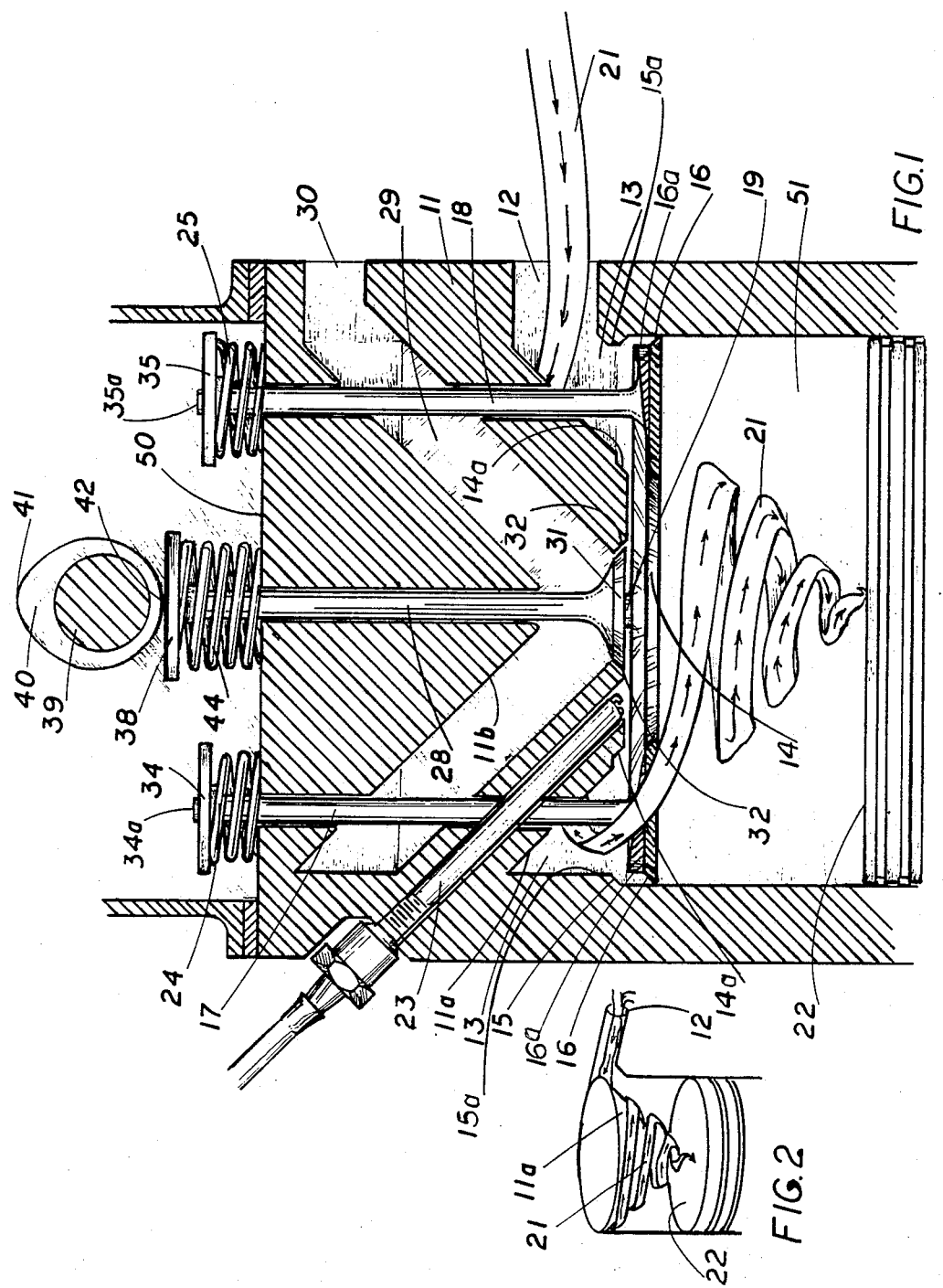
FIG. 1 is a transverse section through one cylinder of an engine made in accordance with this invention in the intake mode. (Line 1—1 of FIG. 6.)
FIG. 2 is a perspective diagrammatic view of the intake flow of FIG. 1.
Figure 5:
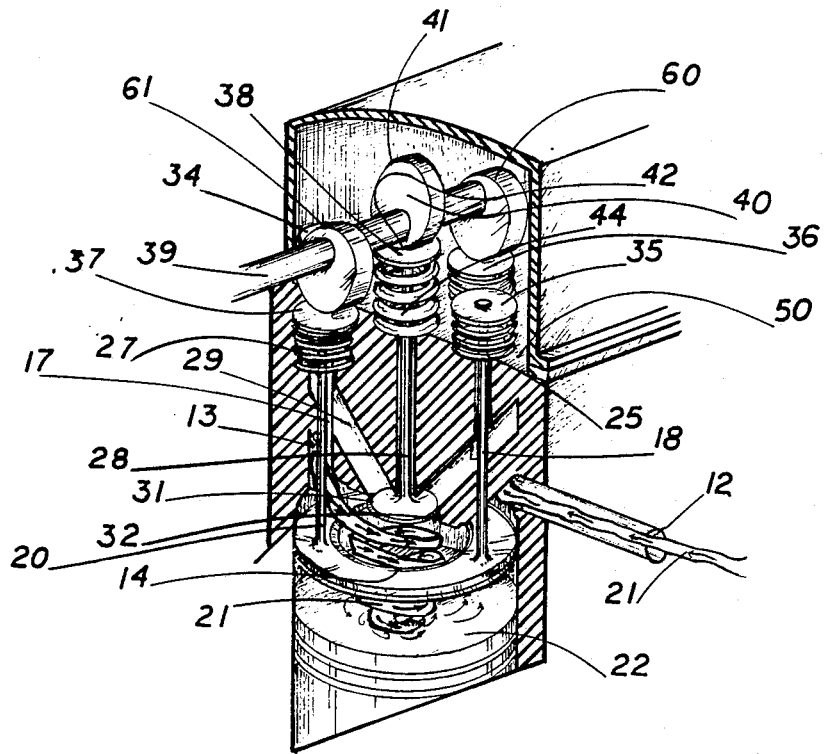
FIG. 5 is a partial perspective cut-away of the block and cylinder in the intake mode.
Figure 6:
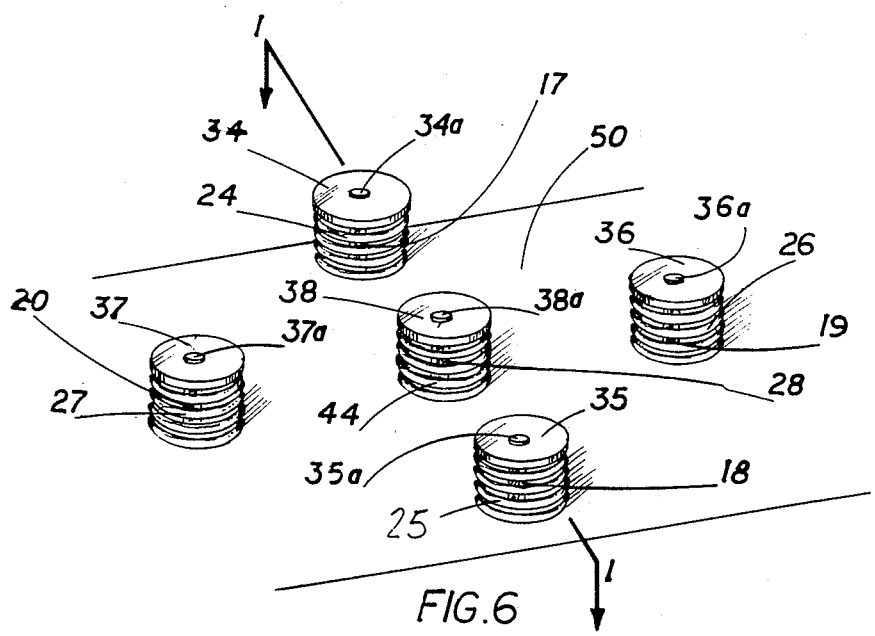
FIG. 6 is a perspective view of a portion of the top of the head without the cams.

As shown in the FIGS. 1–16 and 9 in the drawings, cylinder head 11 has one or more intake orifices 12 tangentially connected to truncated conical intake chamber 13. Flow into the orifice 12 and chamber 13 produces a swirling mixture of fuel and air as diagrammatically illustrated by the flow line 21. The swirling mixture is introduced into cylinder 51 by a flat top piston 22 when intake valve 16a is opened. Intake valve 16a has two beveled edges 14 and 16 and four intake valve stems 17, 18, 19 and 20. When valve 16a is closed, edge 16 seats on valve seat 15 and edge 14 seats on valve seat 14a. A flare is provided on outer edge at the back side of the head of valve 16a as an aid in directing flow. Exhaust valve 31 seats on exhaust valve seat 32.

Camshaft 39 is so arranged that its lobes 60 and 61 alternate in action with lobe 41. Action of identical lobes 60 and 61 on spring-loaded valve stems 19 and 20 opens intake valve 16a Valve stems 17 and 18 serve as stabilizers and act in conjunction with stems 19 and 20 to guide the valve 16a.

When cam lobe 41 acts to open the exhaust valve, springs 24, 25, 26, and 27 close the intake valve 16a. Lobe 41 presses exhaust valve stem 28 so as to open exhaust valve 31 permitting the ribbon flow 52 into truncated conical exhaust passageway 29 having upper wall 11b) to one or more tangentially connected exhaust orifices 30.

Figure 7:
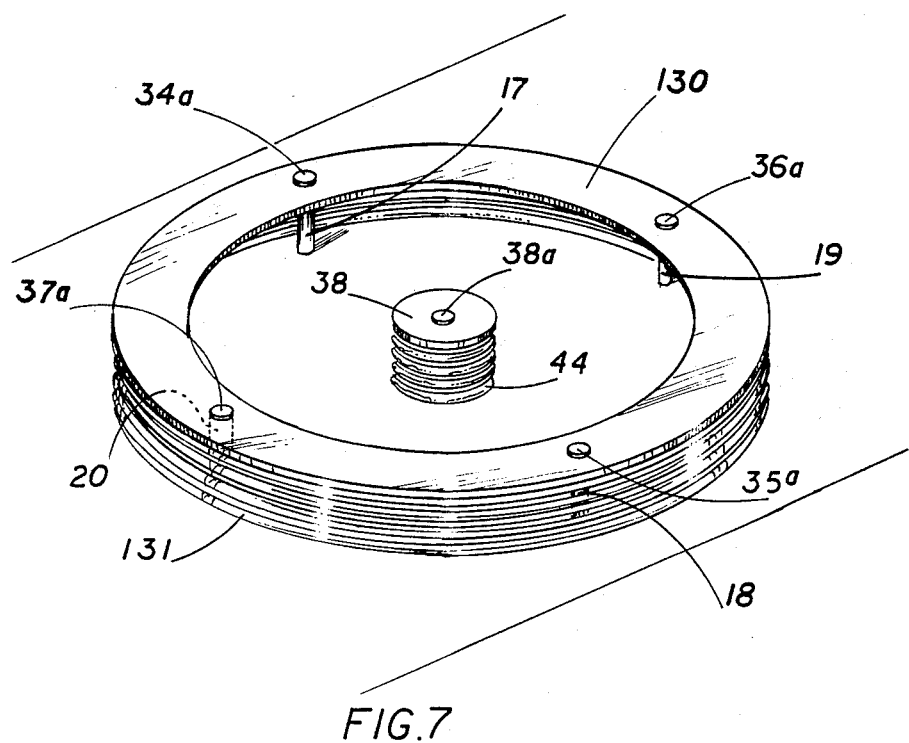
FIG. 7 is an alternative device for operating the intake valve.

Valve retainers 34, 35, 36 and 37 hold springs 24, 25, 26 and 27. Between the camshaft and the valve stems and valve spring retainers are shims 34a, 35a, 36a and 37a which fit into recesses on top of retainers. The stems 17, 18, 19, and 20 are substantially identical. As illustrated in the exploded view (FIG. 9) of the assembly 34X of top portion of stem 17, shim 34a seats in seat 34b of retainer 34. The valve retainer utilizes locks 34d and 34e. Beads 34dd and 34ee extend through the central open portion of retainer 34 and engage stem 17 at groove 34aa. Retainer 34 is positioned on spring 24. These retainers can be replaced by a single circular retainer 130 resembling a flat washer atop the four springs, or atop one single spring 131 as shown in FIG. 7. Spark plug 23 has its electrode at the top of the chamber beside the exhaust valve. A diesel injector may be used in place of the spark plug illustrated and more than one spark plug or diesel injector can be used.

The head of intake valve 16a, as illustrated, extends across the full diameter of the cylinder 51, and the effective opening area is greater than one-half the diameter of the cylinder. Piston height at top dead center subtracted from deck height yields compression ratio. The apex of the cone formed by 11a is on top of piston when at bottom dead center.

Figure 8:
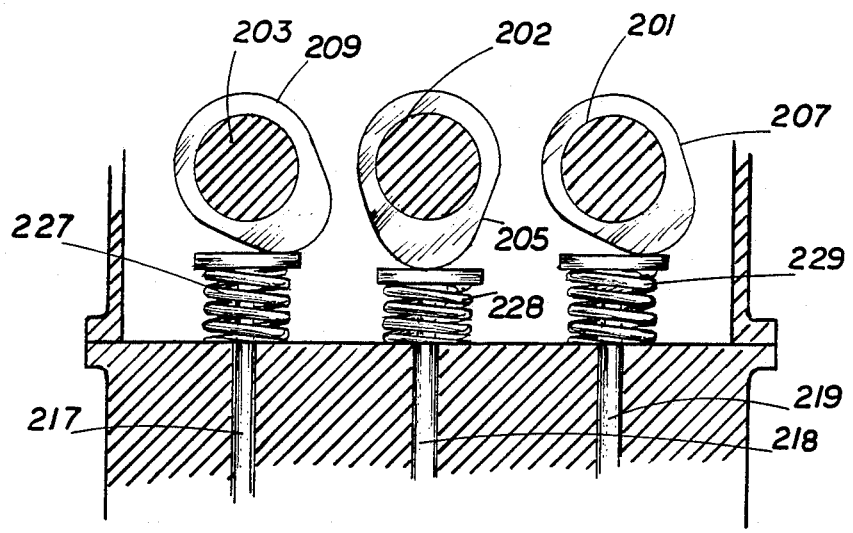
FIG. 8 is a version of the invention which utilizes three camshafts. (Section along line 8—8 of FIG. 10.)
Figure 9:
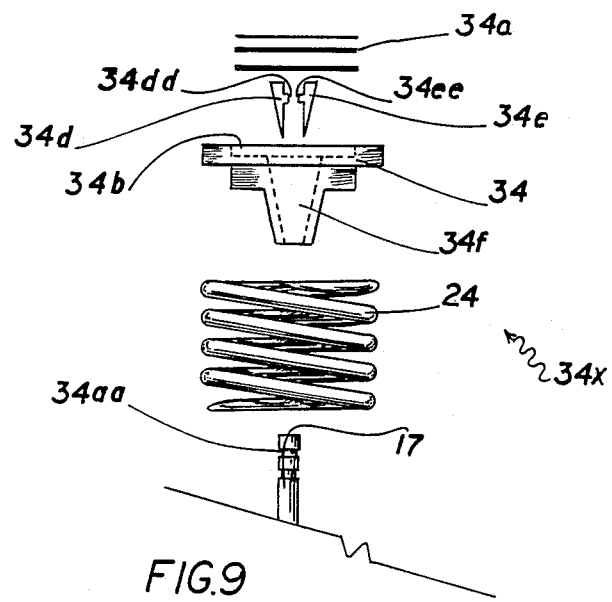
FIG. 9 is an exploded view of the valve stem and spring retainer.
Figure 10:
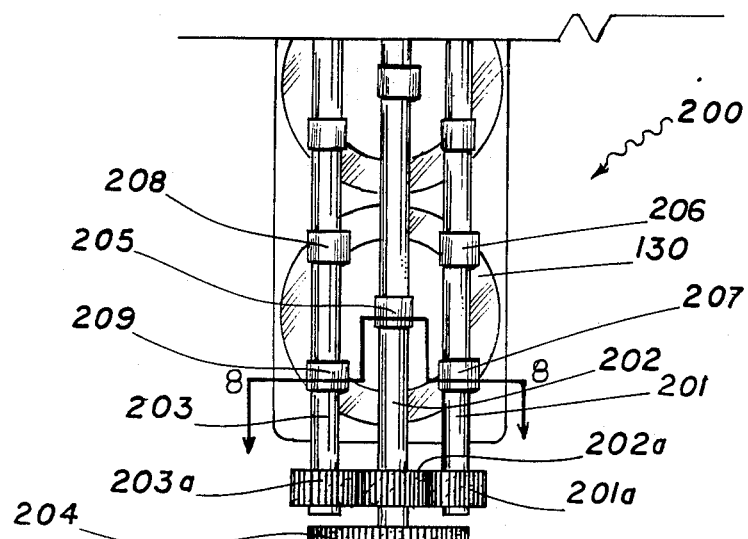
FIG. 10 is a diagrammatic top view of the three cam shaft version.

In the embodiment 200 illustrated in FIGS. 8 and 10 there are three camshafts. Central shaft 202 is driven by gear 204 which engages a conventional timing assembly (not illustrated). Shaft 202 has a lobe 205 which operates on exhaust valve assembly 228 which includes stem 218. Identical parallel shafts 201 and 203 have gears 201a and 203a respectively both driven by gear 202a on shaft 202. Shafts 201 and 203 have pairs of lobes 206 and 207, and 208 and 209 respectively acting simultaneously on the four stems including stems 217 and 218 of the intake valve. The intake valve illustrated in this embodiment is substantially identical to that illustrated in the prior embodiment but has been turned 45° to locate the stems in line with each other on either side of the exhaust valve.

ADVANTAGES AND VARIATIONS

The separate intake and exhaust valves in the tornado engine of this invention triangulate the truncated conical passageways making the cylinder head a light weight but rigid structure during the time of combustion when both valves are seated. This is one feature that distinguishes the present invention from concentric-valve engines of the prior art. The bases of the intake and exhaust cones should be at least as large as cylinder bore diameter but they can also be larger.

As the effective opening diameter of the inlet valve is increased, its weight is decreased, permitting greater r.p.m. and power.

Although the spark plug is shown in a particular position in the drawings, it or a diesel injector can be positioned in the cylinder anywhere between intake and exhaust valves. Also, the amount of opening of the intake valve, as shown in the drawings, is for purposes of illustration only. The desirable valve opening in an engine is determined in accordance with well-known engineering principles and is a function of the dimensions of the engine, revolutions per minute, and load. The great freedom in placement of spark plugs/injectors, and also intake and exhaust ports in this design allow a greater number of head bolts to be used.

When the cylinder head has its valves closed, it presents a flat surface inside the cylinder, thus having the same advantages as a flat top piston (unobstructed flame travel). The ports into the separate inlet and exhaust funnels may be multiple in number. It is preferable that the intake ports be designed for counter-clockwise flow for engines operated in the Northern Hemisphere and clockwise for engines operated in the Southern Hemisphere. Intake ports are tangentially opposite to exhaust ports in all cases.

The exhaust truncated conical passageway, being located above the intake truncated conical passageway, preheats the intake charge although, in some instances, this would not obviate the need for water jacketing of the exhaust. The incoming fuel/air mixture provides circumferential cooling for the exhaust valve and seat.

An exhaust-driven turbo super charger can be used with this invention. This could also incorporate a second intake port which would be of smaller diameter and tangentially opposite to the supply port and would act as a relief port for the turbo. The two ports could crisscross each other between the head and the turbo. The truncated conical exhaust passageway could be similarly modified by having a second exhaust port. In addition, gangs of adjacent cylinders could be fed by a single turbo charger.

In general, the novel engine block head of this invention could be adapted to fit many existing commercial engines.

What is claimed:

1. In an internal combustion engine, a piston operable in a cylinder, cam means, a truncated conical intake passageway to said cylinder, separate intake valve means in said cylinder connecting to said intake passageway, a truncated conical exhaust passageway from said cylinder, and separate exhaust valve means in said cylinder connecting to said outlet passageway; said exhaust passageway being positioned above said intake passageway, said cam means being operable on said intake valve means and said exhaust valve means.

2. The engine of claim 1 wherein said cam means comprises a single camshaft having a plurality of lobes, two of said lobes being operable on said intake valve means and one of said lobes being operable on said exhaust valve means.

3. The engine of claim 1 wherein said cam means comprises a plurality of camshafts each having at least one lobe; two of said camshafts being operable on said intake valve means and another of said camshafts being operable on said exhaust valve means.

4. The engine of claim 1 wherein said intake valve means has four valve stems and said cam means comprises three camshafts, two of said camshafts each having two lobes and simultaneously operable on said four valve stems.

5. The engine of claim 1 wherein there is a port opening into said intake passageway which is tangential to said passageway.

6. The engine of claim 1 wherein there is a port opening out of said outlet passageway which is tangential to said passageway.

7. In an internal combustion engine, a piston operable in a cylinder, separate annular intake valve means for said cylinder, separate exhaust valve means for said cylinder spaced within said annular intake valve means, and cam means comprising camshaft means having a plurality of lobes, two of said lobes being operable on said intake valve means and one of said lobes being operable on said exhaust valve means.

* * * * *